United States Patent Office 3,513,740
Patented May 26, 1970

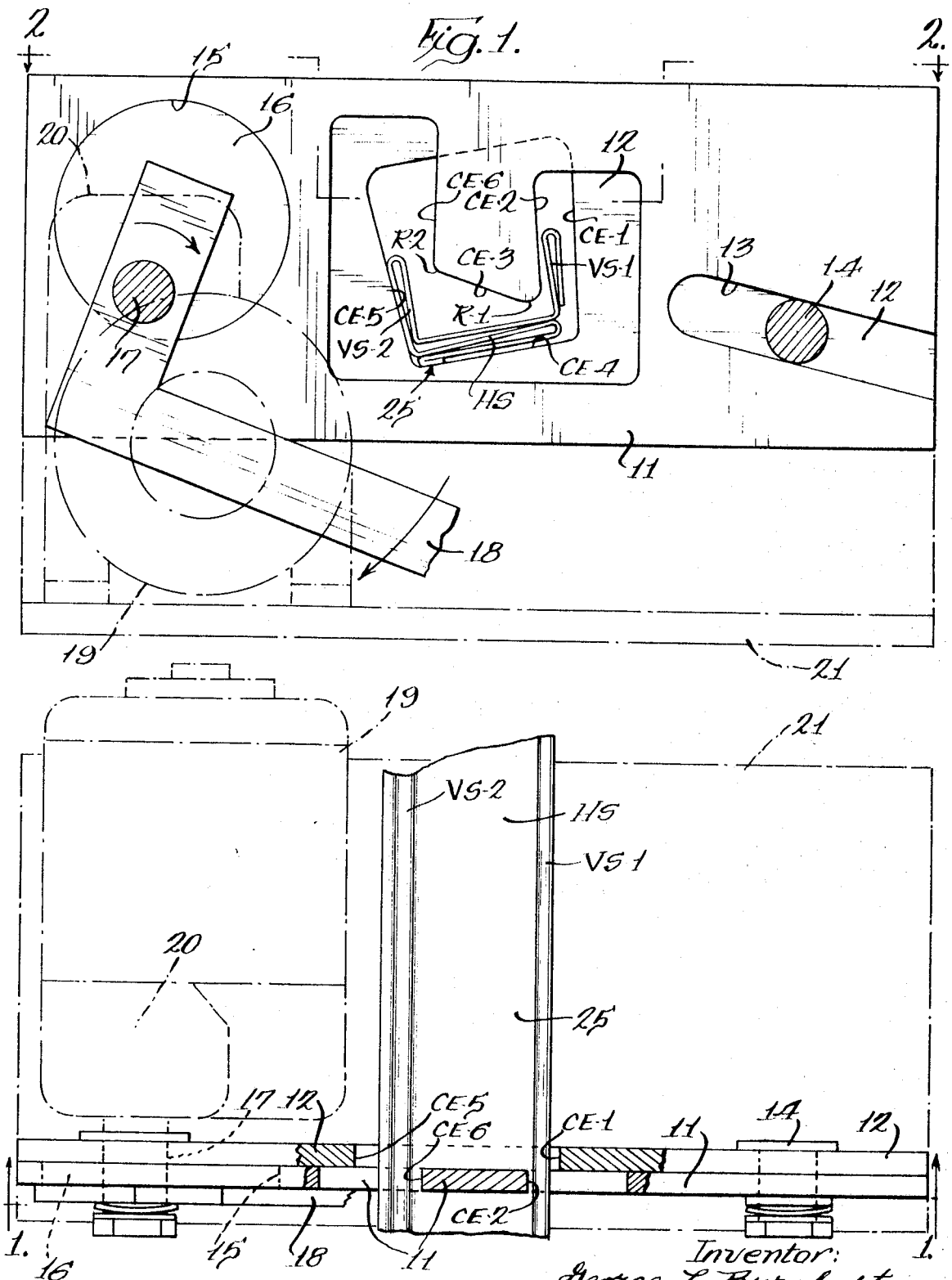

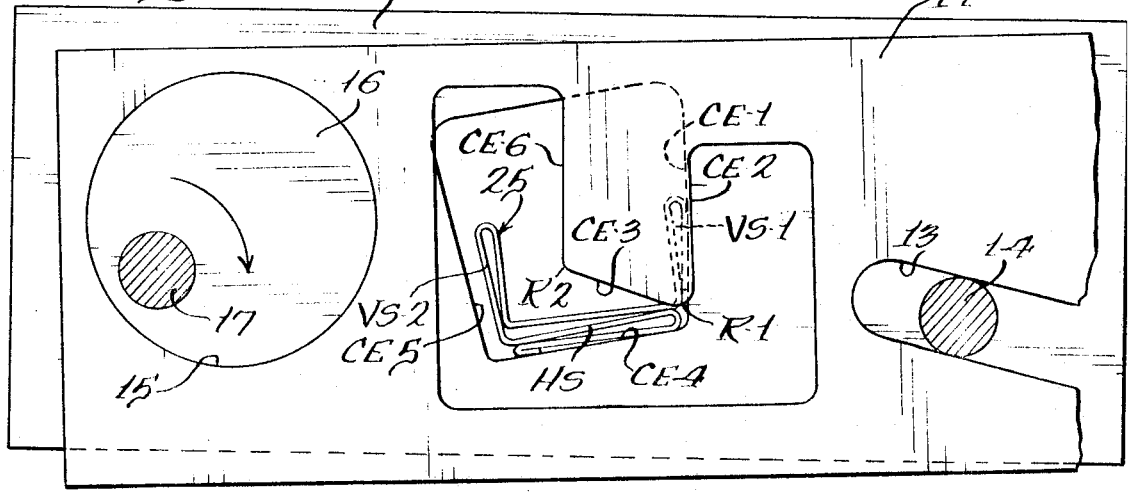
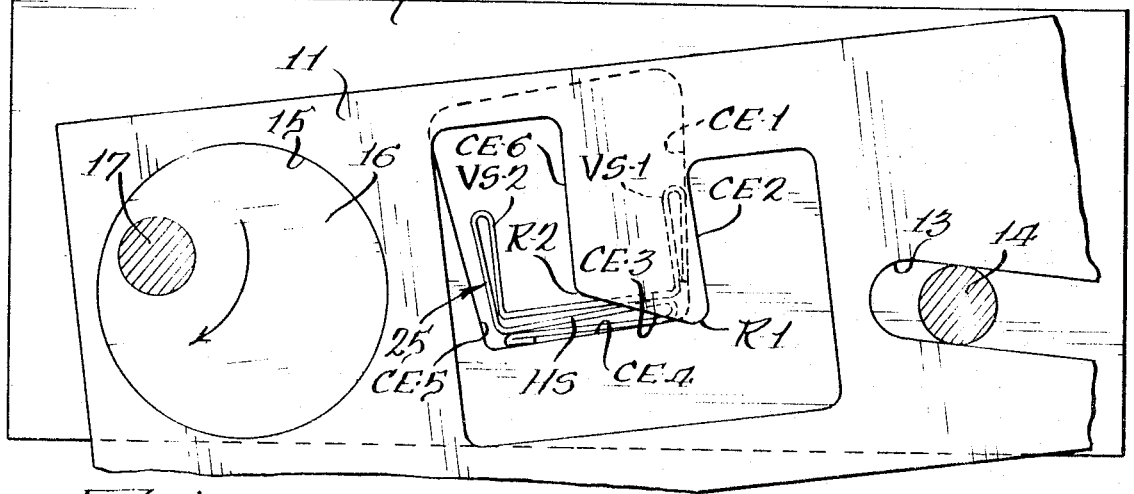
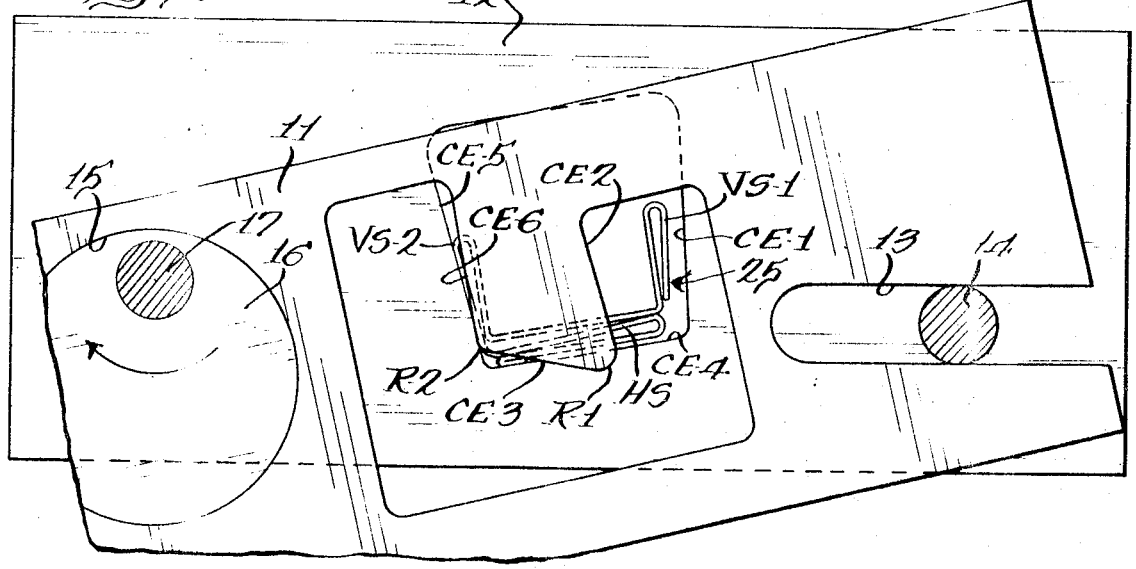

3,513,740
CUTTING DEVICE FOR CLEATS AND OTHER SHAPED STRUCTURALS
George L. Burghart, 1578 Miner St., Des Plaines, Ill. 60016
Filed Apr. 3, 1967, Ser. No. 627,746
Int. Cl. B23d 23/00; B26d 1/00
U.S. Cl. 83—196                                4 Claims

ABSTRACT OF THE DISCLOSURE

A channel iron and cleat cutting device including a first blade having an inside U-shaped cutting edge and a second blade having a sloped bottom outside U-shaped cutting edge mounted together for relative pivotal and sliding movement by a pivot pin and slot and for relative orbital movement by a manually or motor driven eccentric for driving the second blade through a compound pivotal and orbital path relative to the first blade for cutting seriatim a leg, connecting corner, the base and the other corner and leg of the channel.

BACKGROUND OF THE INVENTION

This invention relates to devices for cutting structural shapes.

In recent years I developed an improved cleat structure for joining ends of heating ducts sections during installation of such ducts. This cleat structure has a generally channel shape and is more particularly described in my U.S. Pat. No. 3,246,918, entitled "Cleat Materials," and issued Apr. 19, 1966. In supplying this item to the trade, I have also been called upon to supply a cutting tool for cutting the cleat stock into suitable useable proper lengths. I found no cutting tool commercially available which would satisfactorily and easily perform such cutting operations.

SUMMARY OF THE INVENTION

A general object of this invention has been to provide a suitable tool for cutting such structural shapes as my improved channel-shaped cleat structure described in my aforementioned patent. Another object is the provision of such a tool which is easy to operate and can cut such structural shapes with a single or cropping cut, thereby adapting the tool for fast manual cutting operations. A further object has been to provide such a tool that can accommodate various sizes of structural shapes. Other objects and features of the invention will be apparent from the description and illustrations given herein.

In view of the foregoing objects and in light of the absence of a commercially available tool for performing the operation desired, I have developed a new and useful cutter specifically designed for cutting channel shapes and other structural shapes which have a flange, e.g. a leg or arm upstanding from a base portion. In the specific embodiment to be described more in detail hereinbelow, the tool is especially useful for cutting channel-shaped cleats, although the principles of the invention can also be used for cutting other structural channels, angles, and the like, as well as other diversified shapes.

In accordance with the present invention, I have provided a cutting tool which includes a plurality of blade means which are mounted for movement relative to each other such that a first blade means is movable through a compound pivotal and orbital path relative to another blade means. The blades are mounted and driven so as to cut seriatim various portions of the structure being cut, and the mounting preferably includes a guide system for guiding the blades through the path of movement.

BRIEF DESCRIPTION OF THE DRAWINGS

FIG. 1 is a section and side view along line 1—1 of FIG. 2 of an embodiment of a cutting tool of this invention in position for receiving stock to be cut and showing cleat stock received within the tool;

FIG. 2 is a top plan view along line 2—2 of FIG. 1;

FIG. 3 is a side plan view of the device of FIG. 1 with the cutting blades moved relative to each other to a position in which a portion of the cleat stock is cut;

FIG. 4 is a plan view as in FIG. 5 showing further movement of the blades and further cutting of the cleat stock; and FIG. 5 is a plan view as in FIGS. 1–4 showing the blade position after the stock has been completely cut and before return of the blades to their original position for receiving a new length of stock for subsequent cutting.

DESCRIPTION OF THE SPECIFIC EMBODIMENT

The embodiment of the cutting device or cutter illustrated in the drawings includes first and second blade members 11 and 12 which are mounted together for pivotal sliding movement by a slot 13 in blade 11 which receives a pin 14 secured to blade 12. A circular hole or bore 15 is provided in blade 11 for receiving and capturing a circular cam 16 within bore 15. Cam 16 is mounted by shaft or pin 17 for eccentric rotation on blade 12 and manually operable handle 18 is secured to cam 16 for rotating cam 16 clockwise as indicated by the arrow in FIG. 1. Alternatively, as shown in phantom, a motor 19 and gear box 20, providing suitable gear reduction, can be used to drive cam 16 in the clockwise direction. The motor and gear box can be mounted on a suitable platform 21 to which one of the blades, blade 12 as shown or conversely blade 11, can be secured.

The two blades 11 and 12 have flat facing surfaces which slide over each other during relative movement of the two blades. Although either of the blades can be mounted stationary and the other moved, in the form illustrated the blade 11 is considered to be movable through operation of handle 18, eccentric cam 16, and pivot pin 14. The cam 16, pivot pin and slot combination 13 and 14 and the cutting edges of the blades 11 and 12 are properly positioned to effect cutting of all portions of the cleat during one rotation of cam 16, i.e. one cycle or stroke of the cutter.

Blade 12 includes cutting edges CE–1, CE–4 and CE–5, while blade 11 includes cutting edges CE–2, R–1, CE–3, R–2 and CE–6; and the function of these cutting edges will be more clearly described with respect to the operation of the cutter. In operation, the cleat section to be cut, identified at 25, is first inserted into the generally channel-shaped opening in the cutter in the position illustrated in FIG. 1. Handle 18 and cam 16 are then rotated clockwise as shown in FIG. 1 to first move blade 11 to the right relative to blade 12.

The cropped cut begins as edge CE–2 advances generally horizontally from its position in FIG. 1 toward edge CE–1, pulls vertical section VS–1 of the channel 25 through shift travel motion to the right against edge CE–1. Edge CE–2 continues generally horizontally to its position in FIG. 3 to shear section VS–1 about ¾ of its extent. At this time, edge CE–2 and radius edge R–1 change to a more downward direction and edge R–1 completes cutting the vertical section VS–1 with a slide shearing action. Downward motion of edge R–1 causes shift travel movement of the channel downward momentarily to the position shown in FIG. 4 as edge R–1 then shears out the corner that joins VS-1 and HS. Blade 11 then reverses direction and travels in a generally horizontal direction toward edge CE-5. During this movement, the horizontal section HS of the channel 25 is slide cut by edges CE-3 and CE-4; approximately concurrently the channel 25 shift travels to the left until VS-2 and edge CE-5 abut. A continuation of the sliding cut by edges CE-3 and CE-4 progresses until radius edge R-2 meets vertical section VS-2, whereupon edges R-2, CE-2 and CE-4 begin to shear out the corner that joins HS and VS-2. Continued horizontal and slightly upward movement of cutting edge CE-6 then completes the final cut of VS-2 with a shear and slight sliding upward movement through the position in FIG. 5.

Blades 11 and 12 are preferably machined to proper size and shape to provide the proper cutting edges described above. In the preferred form, the orbital and pivotal motion is provided by the eccentric cam and the slot and pin arrangement, and it will be noted by reference to the drawing that the extended axis or centerline of the slot 13 in which pin 14 rides is spaced from the axis of the cam 16, a proper amount to provide the desired amount of orbital movement.

Also in the preferred embodiment, the timing of the stroke provided by each rotation of cam 16 is such that sufficient time is permitted between the final cutting operation and the return of the blades to their initial or open position (FIG. 1). This permits the operator ample time to ready another section of channel for positioning within the gap between the blades for the next cutting cycle, thereby making the cutting more useful in continuous operation, especially where the cutter is motor driven. It should also be noted that the gap or opening between the blades in the channel receiving initial or open position is of sufficient size to accommodate a variety of channel sizes, and each of these sizes can be conveniently cut by virtue of the shift travel of the channel within the space during the cutting operation as described above. Thus, for example, either large or small channels fitting in the receiver between blades 11 and 12 can be cut; the smaller channels will merely have a greater shift travel than the larger channels during the cutting cycles. Preferably the receiving space between the blades is oversized to permit such shift travel.

I claim:

1. A device for cutting a shaped structural member having a flange portion defining a corner which device comprises a first blade having the general edge shape of one surface of the structural member extending through the corner and flange portion, a second blade having the general edge shape of the other surface of the structural member extending through the corner and flange portion, and slide and cam means mounting said blades for movement through repeating eccentric compound pivotal and orbital movement cycles relative to each other always in the same cyclic orbital direction during each cycle from an open position with the blade edges defining receiving space therebetween for the structural member, thence through a path with cutting edges of the blades overlapping progressively and then returning to said open position at the completion of each cycle, said receiving space being oversized compared with the cross section of the structural member.

2. A device for cutting a shaped structural member having a flange portion defining a corner which device comprises a first blade having the general edge shape of one surface of the structural member extending through the corner and flange portion, a second blade having the general edge shape of the other surface of the structural member extending through the corner and flange portion, and means mounting said blades for compound pivotal and orbital movement relative to each other from an open position with the blade edges defining receiving space therebetween for the structural member, thence through a path with cutting edges of the blades overlapping progressively and then returning to said open position, wherein said mounting means includes a pivot pin secured to one of said blades, a slot in the other blade receiving the pivot pin for sliding pivotal movement of said other blade relative to said one blade, an eccentric cam rotatably mounted on said one blade and engaging said other blade for driving said other blade through an orbital path relative to said one blade with said other blade sliding by said slot on said pin.

3. The device of claim 2 wherein said eccentric cam and the combination of said pin and slot are located spaced across the blade edges.

4. The cutting die of claim 1 for cutting formed sheet metal channel shaped cleats and wherein the first blade has a large inside U-shaped cutting edge sufficiently larger than the outer cross-sectional dimension of the cleat to receive the cleat transversely and spaced therefrom and the second blade has an outside cutting edge the shape of a U with a sloped bottom and sufficiently smaller than the inner cross-sectional dimension of the cleat to be received in the cleat and spaced therefrom for lateral movement therein.

References Cited

UNITED STATES PATENTS

| 981,166 | 11/1911 | Cheney | 83—602 |
| 2,695,059 | 11/1954 | Ernst | 83—199 |
| 2,884,063 | 4/1959 | Stover | 83—566 |
| 3,003,381 | 10/1961 | Biel et al. | 83—646 |
| 3,083,603 | 4/1963 | Peterson | 83—646 X |

FOREIGN PATENTS 588,230  5/1947  Great Britain.

ANDREW R. JUHASZ, Primary Examiner

J. F. COAN, Assistant Examiner

U.S. Cl. X.R.

83—646, 52